(12) United States Patent
Whitcomb

(10) Patent No.: US 8,956,439 B2
(45) Date of Patent: Feb. 17, 2015

(54) ZERO-VALENT CATALYSIS OF METAL ION REDUCTION METHODS, COMPOSITIONS, AND ARTICLES

(75) Inventor: David R. Whitcomb, Woodbury, MN (US)

(73) Assignee: Carestream Health, Inc., Rochester, NY (US)

( * ) Notice: Subject to any disclaimer, the term of this patent is extended or adjusted under 35 U.S.C. 154(b) by 395 days.

(21) Appl. No.: 13/453,248

(22) Filed: Apr. 23, 2012

(65) Prior Publication Data

US 2012/0301742 A1    Nov. 29, 2012

Related U.S. Application Data

(60) Provisional application No. 61/488,851, filed on May 23, 2011.

(51) Int. Cl.
| | | |
|---|---|---|
| *B22F 9/24* | (2006.01) | |
| *B82Y 40/00* | (2011.01) | |
| *C23C 18/12* | (2006.01) | |
| *B22F 1/00* | (2006.01) | |
| *C22C 5/06* | (2006.01) | |

(52) U.S. Cl.
CPC ................ *C23C 18/12* (2013.01); *B82Y 40/00* (2013.01); *B22F 1/0025* (2013.01); *B22F 9/24* (2013.01); *C22C 5/06* (2013.01); *Y10S 977/896* (2013.01)
USPC ............................... 75/362; 75/371; 977/896

(58) Field of Classification Search
None
See application file for complete search history.

(56) References Cited

U.S. PATENT DOCUMENTS

| | | | |
|---|---|---|---|
| 8,613,888 B2 * | 12/2013 | Whitcomb et al. ............ | 420/591 |
| 2006/0159603 A1 | 7/2006 | Vanheusden et al. | |
| 2010/0002282 A1 * | 1/2010 | Agrawal et al. ............... | 359/275 |

FOREIGN PATENT DOCUMENTS

JP    2009-155674    7/2009

OTHER PUBLICATIONS

Chang Chen et al., "Study on the synthesis of silver nanowires with adjustable diameters through the polyol process," Nanotechnology, vol. 17, No. 15, Aug. 14, 2006, pp. 3933-3938.
International Search Report mailed Dec. 3, 2012 for International Application No. PCT/US2012/034729, 3 pages.
Younan Xia, et al., "Shape-Controlled Synthesis of Metal Nanocrystals: Simple Chemistry Meets Complex Physics?," Angew. Chem. Int. Ed., 2009, 48, pp. 60-103.
Benjamin Wiley, et al., "Polyol Synthesis of Silver Nanoparticles: Use of Chloride and Oxygen to Promote the formation of Single-Crystal, Truncated Cubes and Tetrahedrons," Nano Letters, 2004, vol. 4, No. 9, pp. 1733-1739.
Kylee E. Korte, et al., "Rapid synthesis of silver nanowires through a CuCl- or $CuCl_2$-mediated polyol process," J. Mater. Chem., 2008, 18, pp. 437-441.
Jinting Jiu, et al., "Preparation of Ag nanorods with high yield by polyol process," Materials Chemistry and Physics, 2009, 114, pp. 333-338.
Srichandana Nandikonda, "Microwave Assisted Synthesis of Silver Nanorods," M.S. Thesis, Auburn University, Auburn, Alabama, Aug. 9, 2010, 59 pages.
Dapeng Chen, et al., "Large-scale synthesis of silver nanowires via a solvothermal method," J. Mater Sci., Mater Electron, 2011, 22, pp. 6-13.
Shanthi Murali, et al., "Lyotropic Liquid Crystalline Self-Assembly in Dispersions of Silver Nanowires and Nanoparticles," Langmuir, 2010, 26(13), pp. 11176-11183.
Zhong Chun Li, et al., "Sodium chloride assisted synthesis of silver nanowires," Micro & Nano Letters, 2011, vol. 6, Iss. 2, pp. 90-93.
Benjamin Wiley, et al., "Polyol Synthesis of Silver Nanostructures: Control of Product Morphology with Fe(II) or Fe(III) Species," Langmuir, Aug. 30, 2005, vol. 21, No. 18, pp. 8077-8080.

* cited by examiner

*Primary Examiner* — George Wyszomierski
(74) *Attorney, Agent, or Firm* — Reed L. Christiansen

(57) ABSTRACT

Nanowire preparation methods, compositions, and articles are disclosed. Such methods, which reduce metal ions to metal nanowires in the presence of zero-valent metal atoms, are capable of producing long, narrow, nanowires useful for electronics and optical applications.

7 Claims, 1 Drawing Sheet

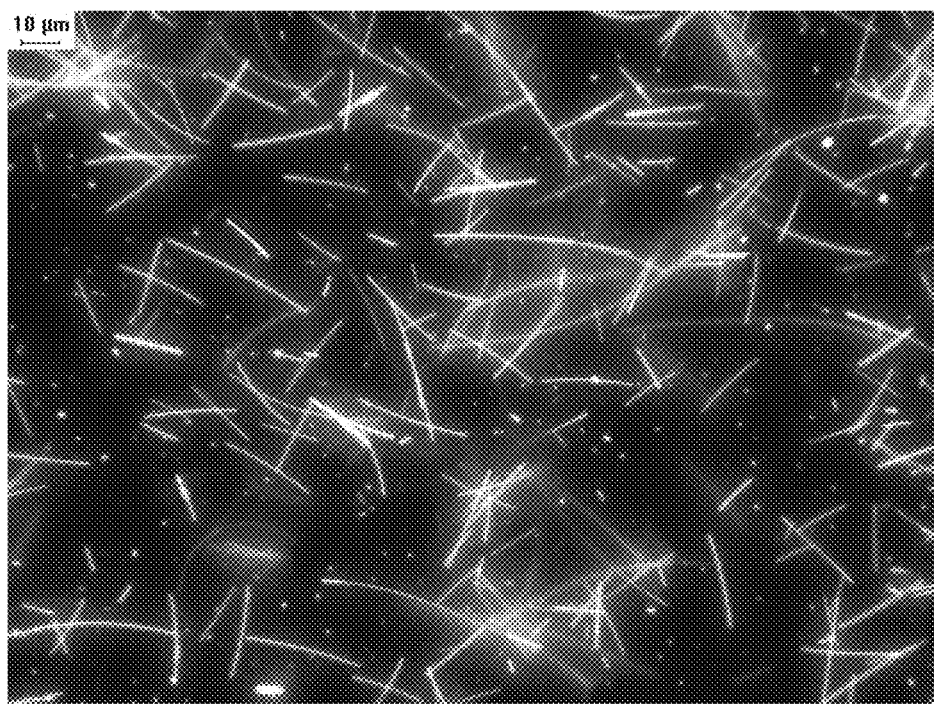

ZERO-VALENT CATALYSIS OF METAL ION REDUCTION METHODS, COMPOSITIONS, AND ARTICLES

CROSS REFERENCE TO RELATED APPLICATIONS

This application claims the benefit of U.S. provisional application No. 61/488,851, filed May 23, 2011, entitled ZERO-VALENT CATALYSIS OF METAL ION REDUCTION METHODS, COMPOSITIONS, AND ARTICLES, which is hereby incorporated by reference in its entirety.

BACKGROUND

The general preparation of silver nanowires (10-200 aspect ratio) is known. See, for example, Angew. Chem. Int. Ed. 2009, 48, 60, Y. Xia, Y. Xiong, B. Lim, S. E. Skrabalak, which is hereby incorporated by reference in its entirety. Such preparations typically employ $Fe^{2+}$ or $Cu^{2+}$ ions to "catalyze" the wire formation over other morphologies. The controlled preparation of silver nanowires having the desired lengths and widths, however, is not known. For example, the $Fe^{2+}$ produces a wide variety of lengths or thicknesses and the $Cu^{2+}$ produces wires that are too thick for many applications.

When iron or copper are used, they are typically provided as the metal halide salts $FeCl_2$ or $CuCl_2$. See, for example, B. Wiley et al., Nano Letters, 2004, 4, 1733-1739 and K. E. Korte et al., J. Mats. Chem., 2008, 18, 437. Other metal halide salts have been used in nanowire synthesis. See, for example, J. Jiu, K. Murai, D. Kim, K. Kim, K. Suganuma, Mat. Chem. & Phys., 2009, 114, 333, which refers to NaCl, $CoCl_2$, $CuCl_2$, $NiCl_2$ and $ZnCl_2$, and S. Nandikonda, "Microwave Assisted Synthesis of Silver Nanorods," M. S. Thesis, Auburn University, Auburn, Ala., USA, Aug. 9, 2010, which refers to NaCl, KCl, $MgCl_2$, $CaCl_2$, $MnCl_2$, $CuCl_2$, and $FeCl_3$, and Japanese patent application publication 2009-155674, which discloses $SnCl_4$. See also S. Murali et al., Langmuir, 2010, 26(13), 11176-83; Z. C. Li et al., Micro & Nano Letters, 2011, 6(2), 90-93; and B. J. Wiley et al., Langmuir, 2005, 21, 8077. Japanese patent application publication 2009-155674 discloses $SnCl_4$.

SUMMARY

At least a first embodiment comprises methods comprising providing at least one second zero-valent metal atom; and reducing at least one first reducible metal ion to at least one first nanowire.

In at least some such methods, providing the at least one second zero-valent metal atom comprises providing a composition comprising at least one first compound comprising the at least one first reducible metal ion; at least one second compound comprising the at least one second zero-valent metal atom; and at least one solvent. In some cases, the at least one second compound comprises at least one metal carbonyl, metal phosphine, or metal phosphine carbonyl, such as, for example, $Cr(CO)_6$, $Mo(CO)_6$, $W(CO)_6$, $Mn_2(CO)_{10}$, $Tc_2(CO)_{10}$, $Re_2(CO)_{10}$, $Fe(CO)_5$, $Ru(CO)_5$, $Os(CO)_5$, $Fe_3(CO)_{12}$, $Fe_2(CO)_9$, $Co_4(CO)_{12}$, $Rh_4(CO)_{12}$, $Rh_6(CO)_{16}$, $Ir_4(CO)_{12}$, $CO_2(CO)_8$, $Ni(CO)_4$, $Ni[P(C_6H_5)_3]_4$, $Pd[P(C_6H_5)_3]_4$, $Pt[P(C_6H_5)_3]_4$, or $Ru(CO)_2(P(C_6H_5)_3)_3$. In some cases, the at least one first compound comprises silver nitrate or the at least one solvent comprises at least one polyol.

In at least some embodiments, the reducing occurs in the present of the at least one second zero-valent metal atom. Exemplary zero-valent metal atoms are Cr, Mo, W, Mn, Tc, Re, Fe, Ru, Os, Co, Rh, Ir, Ni, Pd, and Pt.

Other embodiments provide the at least one first metal nanowire produced according to such methods. Such metal nanowires may, for example, comprise an average diameter of between about 10 nm and about 150 nm and an aspect ratio from about 50 to about 10,000.

At least a second embodiment provides a method comprising providing a composition comprising at least one first compound comprising at least one first reducible metal ion, at least one second compound comprising at least one second zero-valent metal atom, and at least one solvent; and reducing the at least one first reducible metal ion to at least one first metal.

In at least some embodiments, the composition further comprises at least one protecting agent, such as, for example, one or more surfactants, one or more acids, or one or more polar polymers. An exemplary protecting agent may be polyvinylpyrrolidinone. Such methods may further comprise inerting the at least one protecting agent.

The at least one first reducible metal ion may, for example, comprise at least one coinage metal ion, or at least one ion of an element from IUPAC Group 11, such as, for example, at least one silver ion. In such methods, the at least one first compound may, for example, comprise silver nitrate.

The at least one second metal or metal ion may, for example, comprise one metal carbonyl, metal phosphine, or metal phosphine carbonyl, such as, for example, at least one of $Cr(CO)_6$, $Mo(CO)_6$, $W(CO)_6$, $Mn_2(CO)_{10}$, $Tc_2(CO)_{10}$, $Re_2(CO)_{10}$, $Fe(CO)_5$, $Ru(CO)_5$, $Os(CO)_5$, $Fe_3(CO)_{12}$, $Fe_2(CO)_9$, $Co_4(CO)_{12}$, $Rh_4(CO)_{12}$, $Rh_6(CO)_{16}$, $Ir_4(CO)_{12}$, $CO_2(CO)_8$, $Ni(CO)_4$, $Ni[P(C_6H_5)_3]_4$, $Pd[P(C_6H_5)_3]_4$, $Pt[P(C_6H_5)_3]_4$, or $Ru(CO)_2(P(C_6H_5)_3)_3$.

The at least one solvent may, for example, comprise at least one polyol, such as, for example, at least one of ethylene glycol, propylene glycol, glycerol, one or more sugars, or one or more carbohydrates.

In some cases, the composition may have a ratio of the total moles of the at least one second metal or metal to the moles of the at least one first reducible metal ion from about 0.0001 to about 0.1.

In some embodiments, the metal ion reduction may be carried out at one or more temperatures from about 120° C. to about 190° C.

In some cases, such methods further comprise inerting one or more of the composition, the at least one compound comprising at least one first reducible metal ion, the at least one second zero-valent metal, or the at least one solvent.

Other embodiments provide the at least one first metal produced according to such methods. Still other embodiments provide at least one article comprising the at least one first metal produced according such methods. The at least one first metal may, for example, comprise one or more nanowires, nanocubes, nanorods, nanopyramids, or nanotubes. Or the at least one first metal may, for example, comprise at least one object having an average diameter of between about 10 nm and about 500 nm. Or the at least one first metal may, for example, comprise at least one object having an aspect ratio from about 50 to about 10,000.

Yet other embodiments provide at least one metal nanowire with an average diameter of between about 10 nm and about 150 nm, and with an aspect ratio from about 50 to about 10,000. Such a nanowire may, for example, comprise at least one first metal comprising at least one coinage metal, or at least one element of IUPAC Group 11, such as, for example, silver. Yet still other embodiments comprise at least one article comprising such nanowires.

These embodiments and other variations and modifications may be better understood from the brief description of figure, description, exemplary embodiments, example, figure, and claims that follow. Other desirable objectives and advantages inherently achieved may occur or become apparent to those skilled in the art. The invention is defined by the appended claims.

BRIEF DESCRIPTION OF FIGURE

FIG. 1 shows a 400-power optical micrograph of the unpurified silver nanowire product of Example 1.

DESCRIPTION

All publications, patents, and patent documents referred to in this document are incorporated by reference herein in their entirety, as though individually incorporated by reference.

U.S. provisional application No. 61/488,851, filed May 23, 2011, entitled ZERO-VALENT CATALYSIS OF METAL ION REDUCTION METHODS, COMPOSITIONS, AND ARTICLES, is hereby incorporated by reference in its entirety.

Reducible Metal Ions and Metal Products

Some embodiments provide methods comprising reducing at least one reducible metal ion to at least one metal. A reducible metal ion is a cation that is capable of being reduced to a metal under some set of reaction conditions. In such methods, the at least one first reducible metal ion may, for example, comprise at least one coinage metal ion. A coinage metal ion is an ion of one of the coinage metals, which include copper, silver, and gold. Or such a reducible metal ion may, for example, comprise at least one ion of an IUPAC Group 11 element. IUPAC Group 11 elements are sometimes referred to as Group IB elements, based on historic nomenclature. An exemplary reducible metal ion is a silver cation. Such reducible metal ions may, in some cases, be provided as salts. For example, silver cations might, for example, be provided as silver nitrate.

In such embodiments, the at least one metal is that metal to which the at least one reducible metal ion is capable of being reduced. For example, silver would be the metal to which a silver cation would be capable of being reduced.

Nanostructures, Nanostructures, and Nanowires

In some embodiments, the metal product formed by such methods is a nanostructure, such as, for example, a one-dimensional nanostructure. Nanostructures are structures having at least one "nanoscale" dimension less than 300 nm, and at least one other dimension being much larger than the nanoscale dimension, such as, for example, at least about 10 or at least about 100 or at least about 200 or at least about 1000 times larger. Examples of such nanostructures are nanorods, nanowires, nanotubes, nanopyramids, nanoprisms, nanoplates, and the like. "One-dimensional" nanostructures have one dimension that is much larger than the other two dimensions, such as, for example, at least about 10 or at least about 100 or at least about 200 or at least about 1000 times larger.

Such one-dimensional nanostructures may, in some cases, comprise nanowires. Nanowires are one-dimensional nanostructures in which the two short dimensions (the thickness dimensions) are less than 300 nm, preferably less than 100 nm, while the third dimension (the length dimension) is greater than 1 micron, preferably greater than 10 microns, and the aspect ratio (ratio of the length dimension to the larger of the two thickness dimensions) is greater than five. Nanowires are being employed as conductors in electronic devices or as elements in optical devices, among other possible uses. Silver nanowires are preferred in some such applications.

Such methods may be used to prepare nanostructures other than nanowires, such as, for example, nanocubes, nanorods, nanopyramids, nanotubes, and the like. Nanowires and other nanostructure products may be incorporated into articles, such as, for example, electronic displays, touch screens, portable telephones, cellular telephones, computer displays, laptop computers, tablet computers, point-of-purchase kiosks, music players, televisions, electronic games, electronic book readers, transparent electrodes, solar cells, light emitting diodes, other electronic devices, medical imaging devices, medical imaging media, and the like.

Preparation Methods

A common method of preparing nanostructures, such as, for example, nanowires, is the "polyol" process. Such a process is described in, for example, *Angew. Chem. Int. Ed.* 2009, 48, 60, Y. Xia, Y. Xiong, B. Lim, S. E. Skrabalak, which is hereby incorporated by reference in its entirety. Such processes typically reduce a metal cation, such as, for example, a silver cation, to the desired metal nanostructure product, such as, for example, a silver nanowire. Such a reduction may be carried out in a reaction mixture that may, for example, comprise one or more polyols, such as, for example, ethylene glycol (EG), propylene glycol, butanediol, glycerol, sugars, carbohydrates, and the like; one or more protecting agents, such as, for example, polyvinylpyrrolidinone (also known as polyvinylpyrrolidone or PVP), other polar polymers or copolymers, surfactants, acids, and the like; and one or more metal ions. These and other components may be used in such reaction mixtures, as is known in the art. The reduction may, for example, be carried out at one or more temperatures from about 90° C. to about 190° C.

Zero-Valent Metal Compounds

Applicant has discovered that zero-valent metal compounds, such as triiron dodecacarbonyl, $Fe_3(CO)_{12}$, can be used to catalyze the formation of silver nanowires. This is believed to be the first instance where a zero-valent metal compound has been used to control the morphology of metal particle formation. Applicant believes that other zero-valent metal compounds, such as other metal carbonyls, metal phosphines, metal phosphine carbonyls, and the like, can also function as catalysts to control morphology of metal particle formation, such as, for example, the formation of silver nanowires.

Zero-valent compounds comprise one or more metal atoms in their zero valence state. Some zero-valent compounds comprise metal carbonyls, metal phosphines, metal phosphine carbonyls, and the like. Examples of zero-valent metal carbonyl compounds include $Cr(CO)_6$, $Mo(CO)_6$, $W(CO)_6$, $Mn_2(CO)_{10}$, $Tc_2(CO)_{10}$, $Re_2(CO)_{10}$, $Fe(CO)_5$, $Ru(CO)_5$, $Os(CO)_5$, $Fe_3(CO)_{12}$, $Fe_2(CO)_9$, $Co_4(CO)_{12}$, $Rh_4(CO)_{12}$, $Rh_6(CO)_{16}$, $Ir_4(CO)_{12}$, $Co_2(CO)_8$, and $Ni(CO)_4$. Examples of zero-valent metal phosphines include $Ni[P(C_6H_5)_3]_4$, $Pd[P(C_6H_5)_3]_4$, and $Pt[P(C_6H_5)_3]_4$. An example of a zero-valent metal phosphine carbonyl is $Ru(CO)_2(P(C_6H_5)_3)_3$.

Various methods exist to determine whether a metal atom is in its zero valence state. For example, where the metal atom in question is iron, 2,2'-bipyridine will color a solution pink in the presence of $Fe^{2+}$ ions. Because $Fe^{3+}$ ions are believed to be reduced to $Fe^{2+}$ in the presence of ethylene glycol during silver wire nanowire synthesis (see, for example, D-P Chen, X-L Qiao, X-L Qiu, J. Chen, R-Z Jiang, *J. Mats. Sci.: Materials in Electronics*, 2011, 22(1), 6-13), the absence of $Fe^{2+}$ ions in the silver nanowire reaction product mixture is evidence for the presence of only zero-valent iron.

These methods are also believed to be applicable to reducible metal cations other than silver cations, including, for example reducible cations of other IUPAC Group 11 elements, reducible cations of other coinage metals, and the like. These methods may also be used to prepare products other than nanowires, such as, for example, nanocubes, nanorods, nanopyramids, nanotubes, and the like. Such products may be incorporated into articles, such as, for example, transparent electrodes, solar cells, light emitting diodes, other electronic devices, medical imaging devices, medical imaging media, and the like.

EXEMPLARY EMBODIMENTS

U.S. provisional application No. 61/488,851, filed May 23, 2011, entitled ZERO-VALENT CATALYSIS OF METAL ION REDUCTION METHODS, COMPOSITIONS, AND ARTICLES, which is hereby incorporated by reference in its entirety, disclosed the following 26 non-limiting exemplary embodiments:

A. A method comprising:
providing a composition comprising:
at least one first compound comprising at least one first reducible metal ion;
at least one second compound comprising at least one second zero-valent metal atom; and
at least one solvent; and
reducing the at least one first reducible metal ion to at least one first metal.

B. The method of embodiment A, wherein the composition further comprises at least one protecting agent.

C. The method of embodiment B, wherein the at least one protecting agent comprises at least one of: one or more surfactants, one or more acids, or one or more polar polymers.

D. The method of embodiment B, wherein the at least one protecting agent comprises polyvinylpyrrolidinone.

E. The method of embodiment B, further comprising inerting the at least one protecting agent.

F. The method of embodiment A, wherein the at least one first reducible metal ion comprises at least one coinage metal ion.

G. The method of embodiment A, wherein the at least one first reducible metal ion comprises at least one ion of an element from IUPAC Group 11.

H. The method of embodiment A, wherein the at least one first reducible metal ion comprises at least one ion of silver.

J. The method of embodiment A, wherein the at least one first compound comprises silver nitrate.

K. The method of embodiment A, wherein the at least one second compound comprises at least one metal carbonyl, metal phosphine, or metal phosphine carbonyl.

L. The method of embodiment A, wherein the at least one second compound comprises at least one of $Cr(CO)_6$, $Mo(CO)_6$, $W(CO)_6$, $Mn_2(CO)_{10}$, $Tc_2(CO)_{10}$, $Re_2(CO)_{10}$, $Fe(CO)_5$, $Ru(CO)_5$, $Os(CO)_5$, $Fe_3(CO)_{12}$, $Fe_2(CO)_9$, $Co_4(CO)_{12}$, $Rh_4(CO)_{12}$, $Rh_6(CO)_{16}$, $Ir_4(CO)_{12}$, $Co_2(CO)_8$, $Ni(CO)_4$, $Ni[P(C_6H_5)_3]_4$, $Pd[P(C_6H_5)_3]_4$, $Pt[P(C_6H_5)_3]_4$, or $Ru(CO)_2(P(C_6H_5)_3)_3$.

M. The method of embodiment A, wherein the at least one solvent comprises at least one polyol.

N. The method of embodiment A, wherein the at least one solvent comprises at least one of: ethylene glycol, propylene glycol, glycerol, one or more sugars, or one or more carbohydrates.

P. The method of embodiment A, wherein the composition has a ratio of the total moles of the at least one second metal or metal to the moles of the at least one first reducible metal ion from about 0.0001 to about 0.1.

Q. The method of embodiment A, wherein the metal ion reduction is carried out at one or more temperatures from about 120° C. to about 190° C.

R. The method of embodiment A, further comprising inerting one or more of: the composition, the at least one compound comprising at least one first reducible metal ion, the at least one second zero-valent metal, or the at least one solvent.

S. The at least one first metal produced according to the method of embodiment A.

T. At least one article comprising the at least one first metal produced according to the method of embodiment A.

U. The at least one article of embodiment T, wherein the at least one first metal comprises one or more nanowires, nanocubes, nanorods, nanopyramids, or nanotubes.

V. The at least one article of embodiment T, wherein the at least one first metal comprises at least one object having an average diameter of between about 10 nm and about 500 nm.

W. The at least one article of embodiment T, wherein the at least one first metal comprises at least one object having an aspect ratio from about 50 to about 10,000.

X. At least one metal nanowire with an average diameter of between about 10 nm and about 150 nm, and with an aspect ratio from about 50 to about 10,000.

Y. The nanowire of embodiment X, wherein the at least one metal comprises at least one coinage metal.

Z. The nanowire of embodiment X, wherein the at least one metal comprises at least one element of IUPAC Group 11.

AA. The nanowire of embodiment X, wherein the at least one metal comprises silver.

AB. At least one article comprising the at least one metal nanowire of embodiment X.

EXAMPLE

Example 1

A 500 mL reaction flask containing 280 mL ethylene glycol (EG) This EG was stripped of at least some dissolved gases by bubbling $N_2$ into the solution overnight using a TEFLON® fluoropolymer tube at room temperature with mechanical stirring while at 100 rpm. (This operation will be referred to as "degassing" the solution in the sequel.) To this flask was added 6.0 mg of $Fe_3(CO)_{12}$ and 0.50 g of 91 mM diethyldichlorosilane in EG. Stock solutions of 0.25 M $AgNO_3$ in EG and 0.84 M polyvinylpyrrolidinone (PVP) in EG were also degassed by bubbling $N_2$ into the solutions at room temperature. Two syringes were loaded with 20 mL each of the $AgNO_3$ and PVP solutions. The reaction mixture was heated to 145° C. under $N_2$ while stirring at 100 rpm. The $AgNO_3$ and PVP solutions were then added at a constant rate over 25 minutes via 12 gauge TEFLON® fluoropolymer syringe needles. The reaction mixture continued to be held at this temperature for 60 min after addition of these solutions, after which it was allowed to cool to ambient temperature.

A 400-power optical micrograph of the unpurified silver nanowire product is shown in FIG. 1. The nanowires exhibited an average diameter of 104.4±41.8 nm and an average length of 15.2±10.0 µm, based on measurement of at least 100 wires.

The following assay was performed to demonstrate that the iron in the reaction mixture had remained in a zero-valent state. To a reference sample of 0.17 µmol $Fe^{2+}$ as $FeCl_2$ in EG was added 3.0 mg of 2,2'-bipyridine, with thorough mixing.

The resulting solution turned bright pink, as a result of the formation of [Fe(bipy)$_3$]$^{2+}$, confirming the efficacy of the test reagent.

Then, to a 3.0 g sample of the unpurified silver nanowire reaction product was added 3.0 mg of 2,2'-bipyridine, with thorough mixing. The resulting dispersion was centrifuged at 1200G for 20 min to separate the silver nanowires. Except for a faint yellow color due to the presence of silver nanoparticles, the supernatant remained colorless, confirming the absence of Fe$^{2+}$. The supernatant was allowed to stand exposed to air for 48 hrs, after which time it began to take on a slight pink color, indicative of gradual Fe$^{2+}$ formation by air oxidation of zero-valent iron.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed:

1. A method comprising:
   providing at least one second zero-valent metal atom; and
   reducing at least one first reducible metal ion to at least one first nanowire,
   wherein providing the at least one second zero-valent metal atom comprises providing a composition comprising at least one first compound comprising the at least one first reducible metal ion, at least one second compound comprising the at least one second zero-valent metal atom, and at least one solvent, and
   further wherein the at least one second compound comprises at least one metal carbonyl, metal phosphine, or metal phosphine carbonyl.

2. The method according to claim 1, wherein the at least one first compound comprises silver nitrate.

3. The method according to claim 1, wherein the at least one solvent comprises at least one polyol.

4. The method according to claim 1, wherein the at least one second zero-valent metal atom comprises at least one of Cr, Mo, W, Mn, Tc, Re, Fe, Ru, Os, Co, Rh, Ir, Ni, Pd, or Pt.

5. A method comprising:
   providing at least one second zero-valent metal atom; and
   reducing at least one first reducible metal ion to at least one first nanowire,
   wherein providing the at least one second zero-valent metal atom comprises providing a composition comprising at least one first compound comprising the at least one first reducible metal ion, at least one second compound comprising the at least one second zero-valent metal atom, and at least one solvent, and
   further wherein the at least one second compound comprises at least one of Cr(CO)$_6$, Mo(CO)$_6$, W(CO)$_6$, Mn$_2$(CO)$_{10}$, Tc$_2$(CO)$_{10}$, Re$_2$(CO)$_{10}$, Fe(CO)$_5$, Ru(CO)$_5$, Os(CO)$_5$, Fe$_3$(CO)$_{12}$, Fe$_2$(CO)$_9$, Co$_4$(CO)$_{12}$, Rh$_4$(CO)$_{12}$, Rh$_6$(CO)$_{16}$, Ir$_4$(CO)$_{12}$, Co$_2$(CO)$_8$, Ni(CO)$_4$, Ni[P(C$_6$H$_5$)$_3$]$_4$, Pd[P(C$_6$H$_5$)$_3$]$_4$, Pt[P(C$_6$H$_5$)$_3$]$_4$, or Ru(CO)$_2$(P(C$_6$H$_5$)$_3$)$_3$.

6. The method according to claim 5, wherein the at least one first compound comprises silver nitrate.

7. The method according to claim 5, wherein the at least one solvent comprises at least one polyol.

* * * * *